US006585998B2

(12) United States Patent
Cartwright et al.

(10) Patent No.: US 6,585,998 B2
(45) Date of Patent: Jul. 1, 2003

(54) NUTRACEUTICAL COMPOSITION

(76) Inventors: Rudolph Cartwright, #50 Neta Pl., Odessa, TX (US) 79762; Leo Edward Hendricks, 3055 Harrison St. NW., Washington, DC (US) 20015-1309

( * ) Notice: Subject to any disclaimer, the term of this patent is extended or adjusted under 35 U.S.C. 154(b) by 26 days.

(21) Appl. No.: 10/011,028

(22) Filed: Nov. 13, 2001

(65) Prior Publication Data

US 2003/0091552 A1 May 15, 2003

(51) Int. Cl.$^7$ .................. A61K 47/00; A61K 9/68; A61K 33/04
(52) U.S. Cl. ............... 424/439; 424/400; 424/702
(58) Field of Search .................. 424/439, 400, 424/702

(56) References Cited

U.S. PATENT DOCUMENTS

| 4,918,099 | A | * | 4/1990 | Moon ............... 514/453 |
|---|---|---|---|---|
| 5,545,670 | A | | 8/1996 | Bissbort et al. |
| 5,547,927 | A | | 8/1996 | Cope et al. |
| 5,962,030 | A | | 10/1999 | Fine |
| 5,972,985 | A | * | 10/1999 | Thomas et al. ......... 514/400 |
| 6,156,320 | A | * | 12/2000 | Izvekova et al. ...... 424/197.11 |
| 6,203,819 | B1 | | 3/2001 | Fine |
| 6,254,904 | B1 | | 7/2001 | Bailey |
| 6,261,589 | B1 | | 7/2001 | Pearson et al. |

FOREIGN PATENT DOCUMENTS

| WO | Wo-01/26646 | * | 4/2001 |

OTHER PUBLICATIONS

Bosisio, Enrica et al., "Effect of the Flavanolignans of *Silybum marianum L.* on Lipid Peroxidation in Rat Liver Microsomes and Freshly Isolated Hepatocytes", Pharmacological Research, vol. 25, No. 2, 1992, pp. 147–154.

Morazzoni, P. et al., "Comparative pharmacokinetics of silipide and silymarin in rats", European Journal of Drug Metabolism and Pharmacokinetics, vol. 18, No. 3, 1993, pp. 289–297.

* cited by examiner

*Primary Examiner*—Thurman K. Page
*Assistant Examiner*—Blessing Fubara
(74) *Attorney, Agent, or Firm*—Kenyon & Kenyon

(57) ABSTRACT

Provided is a nutraceutical composition including a tripeptoid component, a flavonoid component, guanidine hydrochloride, α-lipoic acid, an amino acid component, a brazilin component, catalase, and, optionally, vitamin E ans selenium. The composition is effective to maintain normal blood sugar levels and normal levels of non-enzymatic protein glycosylation in a human.

32 Claims, No Drawings

NUTRACEUTICAL COMPOSITION

The present invention relates to a nutraceutical composition and a method for maintaining normal levels of blood sugar and normal levels of non-enzymatic protein glycosylation.

BACKGROUND OF THE INVENTION

U.S. Pat. No. 5,156,852 teaches that a composition containing both selenium and vitamin E is useful in treating macular degeneration. U.S. Pat. No. 5,405,613 teaches vitamin and mineral compositions that include bioflavonoids for restoring energetic balance or intensity. Administration of glutathione in combination with vitamin E and selenium has been taught to reduce hematological toxicities in patients undergoing radiation therapy. See U.S. Pat. No. 5,639,482.

U.S. Pat. No. 5,976,568 teaches that the bioflavonoid quercetin can inhibit the enzyme cyclooxygenase and U.S. Pat. No. 6,190,678 teaches a personal care product (skin cleaner) containing, inter alia, brazilin, rutin, glutathione, and α-lipoic acid. Vitamin E and α-lipoic acid are taught as components of a multi-component supplement, that also includes aspirin and magnesium salts, for the treatment and control of diabetes. See U.S. Pat. No. 5,976,568. Applicant is the first to recognize that a bioflavonoid such as quercetin or rutin can be combined with brazilin, α-lipoic acid, and other substances to produce a composition that, when administered to a mammal, is effective to promote normal levels of non-enzymatic protein glycosylation in that mammal.

SUMMARY OF THE INVENTION

In one aspect, the present invention is directed to a nutraceutical composition having a tripeptide component, especially glutathione; a brazilin component, especially brazilin; an amino acid component, especially L-lysine; a flavonoid component, especially one including quercetin, rutin, and silymarin; guanidine hydrochloride; α-lipoic acid; catalase; and, optionally, vitamin E and selenium. In a particular aspect, the invention relates to a nutraceutical composition having between about 190 and about 225 parts by weight (pbw) tripeptide component, between about 5 and about 20 pbw guanidine hydrochloride, between about 10 and about 20 pbw α-lipoic acid, between about 40 and about 60 pbw brazilin component, between about 20 and about 30 pbw amino acid component, between about 100 and about 150 pbw flavonoid component, and between about 10 and about 20 pbw catalase.

The nutraceutical composition can be administered as an oral liquid or solid dosage form. In one aspect, the present invention is directed to an oral liquid dosage form including the nutraceutical composition and one or more vehicles and optional ingredients such as emulsifiers, colorants, and flavorings. In another aspect, the invention is directed to an oral solid dosage form that can be a tablet, a caplet, a gelcap, or a capsule that includes the nutraceutical composition and, optionally, one or more pharmaceutically acceptable excipients as is known in the art. In yet another aspect, the invention is directed to an oral solid dosage form including the nutraceutical composition that can be in the form of at least a first and a second oral solid dosage form whereby the components and constituents of the nutraceutical composition are distributed equally or unequally between the at least first and second dosage forms.

In another aspect, the invention is directed to a method of maintaining healthy normal blood sugar levels and healthy normal levels of non-enzymatic protein glycosylation in a mammal, especially a human, by administering to the mammal a blood sugar and glycosylation maintaining effective amount of a nutraceutical composition of the present invention.

DETAILED DESCRIPTION OF THE INVENTION

As used herein and unless otherwise specified, percent (%) refers to percent-by-weight.

Effective proportion means at least the amount of a component or constituent necessary or sufficient so that, when administered in a blood sugar and glycosylation maintaining effective amount, a nutraceutical composition that includes effective proportions of all components or constituents is effective to maintain normal blood sugar levels and normal levels of non-enzymatic protein glycosylation.

Parts by weight, abbreviated pbw, is given its usual and customary meaning wherein a part can be expressed with reference to any convenient unit of measure, for example ounce or gram. When used with respect to a component or constituent, pbw is with reference to the total nutraceutical composition. For components or constituents that can include water of crystallization (hydration), pbw are based on the component or constituent in the non-hydrated form.

The commercially available components and constituents useful in the practice of the present invention can be used as supplied in pharmaceutically acceptable purity. A reference to a substance includes the essentially pure substance, as well as the substance having the kinds and amounts of impurities as the skilled artisan knows or expects to be present in the commercially available substance.

When each of the components and other constituents of the nutraceutical compositions of the present invention are present in an effective proportion and the nutraceutical composition is administered in a blood sugar and glycosylation maintaining effective amount, the composition is effective to maintain blood sugar and non-enzymatic protein glycosylation in a mammal, preferably a human, in a preferred healthy normal range. In mammals, especially humans, presenting blood sugar levels and levels of non-enzymatic glycosylation outside (especially above) the preferred healthy normal range, especially under stressful situations, the nutraceutical composition is also effective to bring blood sugar levels and levels of non-enzymatic glycosylation closer to or within the healthy or healthier normal range.

In the body, sugar(s) have specific functions. They are the primary substrate for immediate energy. In addition, sugars are a necessary component of, for example, collagen—the body's most abundant connective tissue. Collagen provides the foundation for proper form and function of skin, blood vessels, and numerous other organs.

Blood sugar refers to plasma glucose and is typically expressed as milligrams of glucose per deciliter (mg/dl) of blood. Glucose is a primary cellular energy source and one of the most well controlled substances in the body. When held in its normal healthy range, proper form and function of, for example, collagen is maintained. Plasma glucose rises and falls with eating and physical exertion, a change in metabolic demand, and emotional stress. Fasting plasma glucose concentration and tolerance to a dose of glucose are used to establish normal glucose utilization and disposal. Fasting plasma glucose is usually measured at least 8 but not more than 16 hours postprandial. The healthy normal range for fasting plasma glucose is 60–109 mg/dl. Fasting plasma glucose levels of more than 126 mg/dl can be indicative of a metabolic or endocrinological disease or disorder, stress (emotional, oxidative, and metabolic), or impaired utilization of glucose, for example diabetes.

Plasma glucose can be measured by any means known in the art (finger-stick and capillary blood placed on test strip; withdrawal of venous blood placed on a slide analyzed by computer), for example, The Vitros Test Methodology [Ortho-Clinical Diagnostics, 100 Indigo Creek Drive, Rochester, N.Y. 14626]. After an overnight fast (at least 8 hours), a single sample of blood is drawn and analysed using standardized equipment such as the vitros analyzer. Vitros GLU slides quantitatively measure glucose (GLU) concentration in serum, plasma, and other body fluids. The Vitros GLU Slide is a dry, multilayered, analytical element coated on a polyester support. A 10 $\mu$L drop of a sample of blood is deposited on the slide where the spreading layer promotes the uniform distribution of the sample and permits an even penetration of solute molecules into the underlying reagent layer. The oxidation of sample glucose is catalyzed by glucose oxidase to form hydrogen peroxide and gluconate. This reaction is followed by an oxidative coupling catalyzed by peroxidase in the presence of dye precursors to produce a dye. The intensity of the dye is measured by reflected light.

The reaction can be depicted as follows:

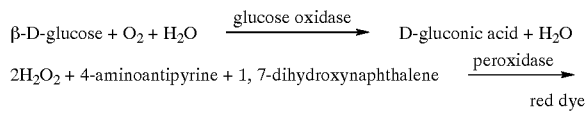

The chemistry of the glucose slides is made possible by reactive ingredients consisting of glucose oxidase (from e.g., Aspergillus Niger); peroxidase (from e.g., horseradish root); 1,7 dihydroxynaphthalene (dye precursor); and 4-aminoantipyrine hydrochloride (dye precursor).

Following the determination that glucose disposal falls below accepted standards of utilization, short-term glucose management requires measuring glucose levels day-to-day. These levels may be affected by time of day, exercise, and foods most recently eaten. The measurements are carried out, either once daily or several times daily, by utilizing a drop of blood after lancing the tip end of a finger and then placing the drop of blood on a small "test strip" that changes colors, calibrated to correlate with a specific level of glucose in the blood. Some test strips are automatically read by a small hand held computer that gives the level of glucose based on the color change. One such device is the Duet® Diabetes Control System [LXN Corporation, 6325 Lusk Boulevard, San Diego, Calif. 92121-2752]. Each strip of the Duet® system contains the following substances: glucose oxidase (Aspergillus), peroxidase (horseradish), indicators, stabilizers, and silica gel (in vial cap). The Duet® Monitor measures the color on the Test Strip and displays the test result on the Monitor display.

Reducing sugars, in particular glucose, can become chemically bound to proteins in the body through a process known as glycosylation or glycation. Glycosylation, the process of adding glucose to any protein, can be mediated by an enzyme or it can be non-enzymatic. The vast majority of biochemical processes that occur in the body require the assistance of enzymes, substances (protein in nature) that increase the velocity of a specific chemical reaction; and the reactions that produce collagen, the tissue that gives strength to and maintains structural integrity of various tissues and organs throughout the body, is no exception. A strand of collagen is made up of amino acids and sugars that are sequenced and cross-linked in a specific manner. During the synthesis of collagen by cells, glucose, with the aid of an enzyme, is incorporated with amino acids. See, e.g., Michael E. Grant and Darwin J. Prockop, The Biosynthesis of Collagen, (pts. 1–3) 286 The New England Journal of Medicine 194, 242, 291 (1972). Because an enzyme is necessary to insert glucose into the strand of collagen during its synthesis, the process is called "enzymatic glycosylation". On other occasions, after collagen has been synthesized, glucose may act merely as a "biologic magnet" and attach itself to the already formed collagen or other proteins in the body without the help of an enzyme. Since the attachment of glucose in this instance depends not on the presence of an enzyme but on the concentration of glucose present in the bloodstream, the glycosylation is called "nonenzymatic". See, e.g., Rudolf Flückiger and Paul M. Gallop, Measurement of Nonenzymatic Protein Glycosylation, 106 Methods in Enzymology 77.

Some level of non-enzymatic protein glycosylation is normal and it reflects the average normal concentration of glucose in the bloodstream over a period of time. However, a level of non-enzymatic glycosylation outside the normal healthy range can have adverse health consequences, such as can occur when a normal healthy level of plasma glucose is not maintained and becomes elevated. See, e.g., Kenneth H. Gabbay et al., Glycosylated Hemoglobins: Increased Glycosylation of Hemoglobin A in Diabetic Patients, 28 Diabetes 337 (1979).

For example, non-enzymatic addition of glucose to DNA can ultimately lead to formation of advanced glycosylation end products, or AGEs. These products, derived from DNA protein and glucose, may lead to differential gene expression and a decline in DNA repair, replication, and transcription which may contribute to the biological aging process. See, e.g., Michael Brownlee et al., Advanced Glycosylation End Products in Tissue and the Biochemical Basis of Diabetic Complications, 318 The New Eegland Journal of Medicine 1315 (1988).

The formation of AGEs in plasma proteins can stimulate macrophages to secrete cytokines, interleukin-1, and tumor necrosis factor. See, e.g., Annette T. Lee and Anthony Cerami, Nonenzymatic Glycosylation of DNA by Reducing Sugars, (deleted in) The Maillard Reacting, in Aging, Diabetes, and Nutrition 291 (1989).

As noted above, glucose (a reducing sugar) is a necessary component of one of the most important and ubiquitous materials in the body—collagen. Aging in mammals is manifested by, among other things, an increasing crystallinity and decreasing solubility, and other property changes as well, of collagen. These changes in properties are associated with crosslinking of collagen. See, e.g., Michael Brownlee et al., Nonenzymatic Glycosylation and the Pathogenisis of Diabetic Complications, 101 Annals of InteralL Medicine 527 (1984). Non-enzymatic glycosylation of the proteinaceous portions of collagen is an important step in this process. Clinical research teaches that normal levels of blood glucose (sugar) are associated with normal levels of non-enzymatic protein glycosylation. A higher level of blood sugar can lead to a higher level of glycosylation and, ultimately, to a higher level of crosslinking of collagen and higher levels of AGEs. Thus, processes that in part characterize the aging process are accelerated when plasma glucose is above the preferred healthy normal range.

The level or extent of non-enzymatic protein glycosylation is conveniently described by either the blood concentration of a particular glycoprotein, hemoglobin A1c, or the concentration of protein in the serum, fructosamine. Hemoglobin A1c (also called H-b-A-1-c) indicates the amount of glucose that is non-enzymatically attached to a minor hemoglobin (Hb) component from the main hemoglobin-A fraction which is a protein of red blood cells. The higher the level of blood sugar, the more glucose will be non-enzymatically attached to red blood cells.

The HbA1c tests are simple tests. One example of such a test is The Abbott IMx® Glycosylated Hemoglobin test [Abbott Laboratories, Diagnostics Division, Abbott Park, Ill. 60064]. This is a boronate affinity binding assay that measures and reports percent total glycosylated hemoglobin, and is also standardized to report percent hemoglobin A1c (%HbA1c). It is based on specific complex formation between glycosylated hemoglobin and polyanion affinity reagent composed of 3-aminophylboronic acid. Although boronate affinity binding methods detect all glycosylated hemoglobin species including HbA1c, these methods show a strong linear correlation with methods that are specific for the HbA1c species, such as ion-exchange chromatography. This linear relationship permits the use of affinity methods to report standardized % HbA1c values. The IMx® Glycosylated Hemoglobin assay utilizes an analyte capture technology called Ion Capture. The glass fiber matrix of the IMx® Ion Capture reaction cell is pre-coated with a high molecular weight quaternary ammonium compound which gives a positive charge to the matrix to enable capturing of negatively charged analyte complexes. During the assay, negatively charged polyanion-analyte complexes are formed. These complexes are captured through electrostatic interaction with the cationic matrix. The IMx® Glycosylated Hemoglobin assay utilizes a soluble affinity reagent composed of di-hydroxyboronate coupled to high molecular weight polyacrylic acid. During the assay, the affinity molecules bind specifically to glycosylated hemoglobin through the interaction between di-hydroxyboronate and the sugar moieties of glycated hemoglobin. Glycosylated hemoglobin is then separated from non-glycosylated hemoglobin by the electrostatic interaction between the polyanionic-glycosylated hemoglobin affinity complex and the cationic surface of the matrix ("ion capture"). Glycosylated hemoglobin is quantified by measuring fluorescence quenching, which is a naturally occurring property of hemoglobin. The IMx® Glycated Hemoglobin Reagent pack and ion capture reaction cells are packaged together as a set.

HbA1c is reported as a percentage of the minor hemoglobin component in the blood stream that has glucose attached (glycohemoglobin). The higher that percentage, the higher the average daily blood glucose for the prior 2–3 months. This can easily be understood by examining how HbA1c percentages directly correlate to the average daily blood glucose levels over the prior 2 to 3 months. For example, a HbA1c level of 5% equates to an average daily blood glucose level of about 90 mg/dl, and a HbA1c level of 4% is equivalent to an average daily blood glucose of about 60 mg/dl, which is a desirable normal healthy value.

The nutraceutical compositions of the present invention include a tripeptide component. The tripeptide component includes trimers having residues of naturally occurring L-amino acids. Such trimers can include residues of a single amino acid or they can contain residues of up to three different amino acids. The tripeptide component can also be a peptidomimetic. The peptidomimetic is not an amino acid trimer, but has an acid group and an amine group and mimics the bioactivity of an amino acid trimer.

The preferred tripeptide component includes glutathione (γ-L-glutamyl-L-cysteinylglycine). Glutathione useful in the present invention can be obtained from, for example, Glen Madison Co., 38306 Pine Creek Place, Murrieta, Calif. 92562. The tripeptide component is used in an effective proportion of between about 190 to about 225 pbw, preferably between about 190 to about 210 pbw. The tripeptide component can also include vitamin E and selenium.

The nutraceutical composition of the present invention also includes a brazilin component. The term brazilin component denotes that part or constituent of a composition that can be isolated from, for example, *Caesalpinia echinata* (Brazil-wood) or *Caesalpinia sappan* L. (Sappan-wood), to mention just two, and that contains a major amount of 7,11b-dihydrobenz[b]indeno[1,2-d]pyran-3,6a,9,10(6H)-tetrol ("brazilin"). Preferably, the brazilin component includes at least 15% and more preferably at least 21% brazilin. The brazilin component is used in an effective proportion of between about 40 and about 60 pbw, preferably between about 45 and about 55 pbw. The brazilin component can also contain vitamin E and selenium.

The nutraceutical composition of the present invention also includes at least one flavonoid component. The flavonoid component includes one or more flavonoid compounds as constituents. The flavonoid compounds useful in the present invention are characterized in that their structure includes either a flavone, isoflavone, flavanone, isoflavanone, catechin, flavan, flavanonol, chalcone, anthocyanidin, flavanol, flavonol, isoflavonol, or biflavonoid moiety. One skilled in the art of bioflavonoids will recognize that a large number of compounds, both glucosides and aglycones, fall within this description and can be used in the practice of the present invention. Preferred flavonoid compounds include apigenin, myriceten, tricetin, quercetin, naringin, kaempferol, luteolin, biflavonyl, silymarin, and glycosides of any of them, for example rutin (quercetin-3-rutinoside). All of these are known in the art. See Frederick J. Francis, *Pigments and Other Colorants*, in Food Chemistry, 545, 563–565 (Owen R. Fennema, ed., $2^{nd}$ ed., 1985). Particularly preferred flavonoid components and particularly preferred nutraceutical compositions have quercetin, rutin, and silymarin. The flavonoid component is used in an effective proportion that is between about 100 and about 150 pbw, preferably between 120 to 130 pbw.

Quercetin is but one example of a flavonoid compound that is useful in the practice of the present invention. Quercetin is widely distributed in plants. Quercetin is available commercially from several sources, for example, Nutritional Corporation, 1400 Kearns Boulevard, Park City, Utah 84060. When used in a nutraceutical composition of the present invention, quercetin is preferably used at between about 40 and about 60 pbw.

Rutin is yet another example of a flavonoid compound useful in the practice of the present invention. Rutin is a glycoside of quercetin, is widely distributed in plants, including the buckwheat plant (*Fagopyrum esculentum* Moench.), and is available commercially from, for example, Sigma-Aldrich Chemical Company, 3050 Spruce Street, St. Louis, Mo. 63101. When used in a nutraceutical composition of the present invention, rutin is preferably used at between about 10 to about 25 pbw.

Silymarin is still another example of the flavonoid compounds useful in the practice of the invention. Silymarin can be isolated from, for example, *Silybum marianum* (L.). Silymarin used in the present invention can be essentially isometrically pure silybin (2-[2,3-dihydro-(4-hydroxy-3-methoxyphenyl)-2-(hydroxymethyl)-1,4-benzodioxin-6-yl]-2,3-dihydro-3,5,7-trihydroxy-4H-1-benzopyran-4-one), as well as mixtures of silybin, silydianin, and silychristin which are isomers such as are known in the art under the collective name silymarin or silymarin group. Preferably the silymarin includes at least 50% silybin. When used in a nutraceutical composition of the present invention, silymarin is preferably used at between about 50 and about 70 pbw and preferably constitutes between about 40% and about 60% of the flavonoid component.

The flavonoid component can also include vitamin E and selenium.

The nutraceutical composition of the present invention also contains guanidine hydrochloride. Guanidine hydrochloride suitable for use in the present invention is available from, for example, Mallinckrodt Baker, Inc., 222 Red School Lane, Phillipsburg, N.J. 08865. The effective proportion of guanidine hydrochloride used in the present invention is preferably between about 5 and about 15 pbw, most preferably about 10 pbw.

The nutraceutical composition of the present invention also contains $\alpha$-lipoic acid, the disulfide of 6,8-dithiooctanoic acid. Alpha lipoic acid useful in the practice of the present invention is available from, for example, Barrington Chemical Corporation, 500 Mamaroneck Ave., Harrison, N.Y. 10528. The effective proportion of $\alpha$-lipoic acid used in the present invention is preferably between about 10 and about 20 pbw, most preferably about 15 pbw.

The nutraceutical composition of the present invention also contains an amino acid component. The amino acid component includes any one or more of the twenty naturally-occurring L-amino acids. Preferably, the amino acid component includes L-lysine. More preferably, the amino acid component consists essentially of L-lysine. L-lysine useful in the practice of the present inventions is available from many sources, for example Barrington Chemical Company, 500 Mamaroneck Ave., Harrison, N.Y. 10528. The effective proportion of amino acid component used in the present invention is preferably between about 15 and about 35 pbw, most preferably about 25 pbw. The amino acid component can also contain vitamin E and selenium.

The nutraceutical composition of the present invention further includes catalase (caperase) which denotes a class of iron-porphyrin enzyme that catalyzes degradation of hydrogen peroxide. The enzyme is widely distributed in plants and animals. Catalase useful in the practice of the present invention can be obtained from animal liver, or it can be obtained from bacteria (e.g. *Micrococcus lysodeikticus*) or fungi (e.g. *Aspergillus niger*). Catalase useful in the practice of the present invention can be obtained from, for example, Sigma-Aldrich Chemical Company, 3050 Spruce Street, St. Louis, Mo. 63103. The effective proportion of catalase component used in the present invention is preferably between about 10 and about 20 pbw, most preferably about 15 pbw. Preferably, the nutraceutical composition of the present invention also includes the constituents vitamin E and selenium. These constituents can be but need not be a constituent of the tripeptide, amino acid, brazilin, or flavonoid components. When used and not part of another component, vitamin E and selenium are introduced separately or together. When part of a component, they are introduced in that component.

Consistent with the recommendations of the I.U.P.A.C.—I.U.B. Joint Commission on Biochemical Nomenclature, the term vitamin E is used to describe all tocol and tocotrienol derivatives, including esters, exhibiting qualitatively the biological activity of $\alpha$-tocopherol. Where a specific amount or portion of vitamin E is mentioned, it is understood that it pertains to that amount of d-alpha-tocopherol and any other amount of any biologically active tocol or tocotrienol species that is equivalent, in terms of international units, to the specific amount of d-alpha-tocopherol mentioned. Where used, vitamin E is present in an amount equivalent to between about 5 to about 35 pbw of d-alpha tocopherol mentioned. Vitamin E suitable for use in the present invention is available from, for example, Hoffman-La Roche Inc., 45 Waterview Blvd., Parsippany, N.J. 07054.

Selenium is an organically chelated form obtained from Dews Research Laboratory, FM 1821 North, Mineral Wells, Tex. 76067.

The nutraceutical compositions of the present invention are intended for administration to a mammal, in particular a human being, in a suitable dosage form as is known in the art. Suitable dosage forms known in the art include parenteral, enteral, and especially oral. Oral solid and liquid dosage forms are particularly preferred.

Oral solid dosage forms are well known in the art and include tablets, caplets, gelcaps, capsules, and edible food items. Oral solid dosage forms can be made with one or more pharmaceutically acceptable excipients. Pharmaceutically acceptable excipients assist or make possible the formation of a dosage form for a bioactive material and include diluents, binding agents, lubricants, glidants, disintergrants, coloring agents, and flavorants and nutrients. An excipient is pharmaceutically acceptable if, in addition to performing its desired function, it is non-toxic, well tolerated upon ingestion, and does not interfere with absorption of bioactive materials.

Tablets can be made by well-known compression techniques using wet, dry, or fluidized bed granulation methods. The effective proportions of tripeptide component, brazilin component, amino acid component, flavonoid component, guanidine hydrochloride, $\alpha$-lipoic acid, catalase, and, when used and introduced independently of any component, the vitamin E and selenium are combined with the desired amount of a pharmaceutically acceptable excipient (e.g. lactose, starch, dextrin, ethyl cellulose and the like) and, in the case of wet granulation, water. The ingredients are mixed in a blender. Useful blenders include the twin-shell type, the planetary mixer type, and the high-speed high-shear type; all of which are known to the skilled artisan. The blended combination is sieved and dried to a granulate. The granulate is then compressed into tablets using a tableting press as is known in the art. Preferably, the granulate is sieved before the compression to make sure that the granulate has the desired particle size.

Tablets can be either coated or uncoated as is known in the art.

Tablet making is well known to skilled artisan and routiner alike and is described, for example, by Edward Rudnic and Joseph B. Schwartz, *Oral Solid Dosage Forms*, in Volume II, *Remington: The Science and Practice of Pharmacy*, Chpt. 92, 1615, 1615–1637 (Alfonso R. Gennaro, ed., $19^{th}$ ed. 1995), incorporated herein by reference.

The proportion of components and constituents, binder, excipients, and water (if used), as well as the time and intensity of mixing, will be optimized by the routiner to obtain a granulate with the desired tableting characteristics.

Capsules, also know as dry filled capsules, are oral solid dosage forms in which the composition is contained in a swallowable container of suitable size, typically made of gelatin. Hard empty capsules suitable for containing the nutraceutical composition of the present invention are available from several sources, for example, Tishcon Gel-Tec, 2410 N. Zion Rd., Salisbury, Md. 21801; the capsules are supplied in two halves and in various sizes. The sizes are typically designated by number; 000 is presently the largest size in common use, 5 is the smallest size presently in common use. The capsule halves can be colored by a suitable coloring agent and each halve can be the same or a different color.

In making a solid oral dosage form that is a capsule, the components and constituents are combined and mixed together, with or without a diluent such as lactose, mannitol, calcium carbonate, or the like using any of the mixers described above. Prior to mixing, a granulate of one or more of the components or constituents can be prepared as in the making of tablets. The combined mixed components, constituents and excipients, if any, are packed into one capsule half. The filled half-capsule is then closed with the other capsule half. Manual, semiautomatic, and automatic equipment for filling capsules are known in the art.

The art of capsule filling is well known to the skilled artisan and routiner alike and is described, for example, by Edward Rudnic and Joseph B. Schwartz, *Oral Solid Dosage Forms*, in Volume II, *Remington: the Sciemce and Practict of Pharmacy*, Chpt. 92, 1615, 1642–1647 (Alfonso R. Gennaro, ed., $19^{th}$ ed. 1995), incorporated herein by reference.

When the oral solid dosage form is either a tablet, gelcap, capsule, or caplet, administration can be more convenient when the nutraceutical composition is in the form of multiple oral solid dosage forms. That is, in the form of at least first and second oral solid dosage forms. The compositions of the at least first and second oral solid dosage forms can be the same or they can be different. Thus, in embodiments having multiple oral solid dosage forms, the entire effective proportion of a component or constituent can be in one of the at least first and second oral dosage forms, or such effective proportion can be distributed equally or unequally between each of the at least first and second oral sold dosage forms.

When a component as a whole is unequally distributed between at least first and second oral solid dosage forms, any individual constituent of such component can be distributed equally or unequally between the multiple oral solid dosage forms.

In embodiments having at least first and second oral solid dosage forms, the effective proportion of tripeptide component is preferably distributed equally among the multiple solid dosage forms. In a particularly preferred embodiment, the tripeptide component is at least $\geq 42\%$ glutathione.

When the effective proportion of the flavonoid component is distributed between at least first and second oral solid dosage forms, the flavonoid compound constituents of the flavonoid component are preferably distributed equally or, if not distributed equally, they are preferably distributed in such a way that the entire amount of any one constituent of the component is entirely within one of the at least first and second oral solid dosage forms. Most preferably, when a flavonoid component is distributed between multiple oral solid dosage forms, it is distributed equally. In a particularly preferred embodiment, the flavonoid component includes quercetin, rutin, and silymarin.

In embodiments having at least first and second oral solid dosage forms, the effective proportions of guanidine hydrochloride, α-lipoic acid, brazilin component, amino acid component, catalase, and, when used, vitamin E and selenium can be, independently of each other, entirely in any one of the multiple oral solid dosage forms, or the effective proportions of any of them can be distributed, preferably equally, between the multiple oral solid dosage forms.

The oral solid dosage form used in the present invention can be a chewable food item that includes the nutraceutical composition. In addition to the nutraceutical composition, the chewable food item can and preferably does contain one or more nutrients such as soy protein isolate, soy protein hydrolysate, calcium caseinate, whey protein isolate, whey protein concentrate, milk protein isolate, skim milk powder, yogurt solids, or hydrolyzed bovine gelatin in combination with oils, binders, fillers, and processing aids known in the art. The oral solid dosage form is formed of a mass having the desired ingredients into a shape, preferably a bar having a circular, semicircular, or rectangular cross-section by, for example, extrusion, and cut into chewable food item dosage forms of about 50 to about 175 grams each whereby each such dosage form includes a blood sugar and glycosylation maintaining effective amount of the nutraceutical composition.

Oral liquid dosage forms are prepared with one or more vehicles and include solutions, emulsions, and suspensions. A vehicle can be any potable substance or mixture of potable substances that are liquid at room temperature and that do not interfere with the effectiveness of the nutraceutical composition. Water, ethanol, and oils, especially vegetable oils and seed oils, are preferred vehicles. Water is a particularly preferred vehicle. Emulsions and suspensions are preferred liquid oral dosage forms. Suspensions are particularly preferred liquid oral dosage forms.

In the case of an oral liquid dosage form that is an emulsion, two vehicles having limited mutual solubility can be used.

Oral liquid dosage forms may be hybrid. In one example of an oral liquid dosage form that is a hybrid, one or more constituents or components, or a fraction of them, are dissolved in a vehicle, and the remainder are in suspension in the vehicle. In another example of a liquid oral composition that is a hybrid, one or more constituents or components, or any fraction thereof, of the nutraceutical composition are dissolved in a first vehicle and the remainder are suspended or dissolved in a second vehicle that forms an emulsion with the first vehicle. Other hybrid liquid oral dosage forms will be apparent to the skilled artisan and are within the scope of this invention.

The making of oral liquid dosage forms is well known to the skilled artisan and routiner alike and is described, for example, by J. G. Narin, *Solutions, Emulsions, Suspensions and Extracts*, in Volume II *Remington: the Science and Practice of Pharmacy*, Chpt. 86, 1495, 1495–1521 (Alfonso R. Gennaro, ed., $19^{th}$ ed., 1995), incorporated herein by reference.

These oral liquid dosage forms can be ready-made, that is introduced into commerce in the liquid form in which they are to be administered. Preferred oral liquid dosage forms of the ready-made type are in the form of a beverage that can be carbonated. Alternatively, a dry concentrate of the oral liquid dosage form can be supplied in the form of a powder that can be mixed by the practitioner or consumer with a potable liquid (e.g. milk, water, fruit juice) to form the oral liquid dosage form prior to administration. Powders can contain additives known in the art to prevent caking of the powder and maintain desirable free-flowing characteristics of the powder.

The nutraceutical compositions of the present invention are administered in a blood sugar and glycosylation maintaining effective amount. Typically, this effective amount is between about 400 mg and about 1000 mg (exclusive of excipients and the like) per 24-hour period. Preferably, sufficient composition in any form is administered in the form of an oral solid or liquid dosage form such that recipient receives at least about: 200 mg tripeptide component, 127.5 mg flavonoid component, 25 mg amino acid component, 10 mg guanidine hydrochloride, 15 mg α-lipoic acid, 50 mg brazilin component, 15 mg catalase, 30 mg vitamin E, and 25 mcg selenium in a 24 hour period. The preferred dosage for a human is between 6 mg and about 8 mg of nutraceutical composition, more preferably between about 6.5 mg and about 7 mg of nutraceutical composition, per kilogram of body weight.

When the nutraceutical composition is in the form of at least first and second oral solid dosage forms, the multiplicity of oral solid dosage forms can be administered as close to simultaneously as is practical, or they can be administered several hours apart. Preferably, multiple oral solid dosage forms are administered as close to simultaneously as is practical under the circumstances. When the nutraceutical composition is administered as an oral liquid dosage form, the total volume of the dosage form is preferably between about 50 and about 300 milliliters.

We claim:

1. A nutraceutical composition comprising the following constituents:
   1) a tripeptide component,
   2) guanidine hydrochloride,
   3) α-lipoic acid,
   4) a brazilin component,
   5) an amino acid component,
   6) a flavonoid component, and
   7) catalase;
   wherein each constituent is present in an effective proportion such that, when administered to a human in a blood sugar and glycosylation maintaining effective amount, the nutraceutical composition is effective to maintain normal blood sugar levels and normal levels of non-enzymatic protein glycosylation in the human.

2. The composition of claim 1 further comprising an effective proportion of vitamin E and selenium.

3. The composition of claim 1 in an oral liquid dosage form.

4. The composition of claim 1 in an oral solid dosage form.

5. The composition of claim 1 in the form of at least first and second oral solid dosage forms.

6. The composition of claim 5 in the form of first and second oral solid dosage forms wherein the first oral solid dosage form comprises:
   1) from none to all of the effective proportion of the tripeptide component,
   2) from none to all of the effective proportion of guanidine hydrochloride,
   3) from none to all of the effective proportion of α-lipoic acid,
   4) from none to all of the effective proportion of brazilin component,
   5) from none to all of the effective proportion of the amino acid component,
   6) from none to all of the effective proportion of the flavonoid component, and
   7) from none to all of the effective proportion of catalase;
   with the proviso that the first oral solid dosage form includes at least a fraction of the effective proportion of at least one constituent, but less than the entire effective proportion of at least one constituent; and wherein the second solid oral dosage form comprises any fraction of the effective proportions of tripeptide component, guanidine hydrochloride, α-lipoic acid, amino acid component, brazilin component, flavonoid component, and catalase not included in the first solid oral dosage form.

7. The composition of claim 6 wherein the first oral solid dosage form further comprises from none to all of an effective proportion of vitamin E and from none to all of an effective proportion of selenium and wherein the at least second oral solid dosage form comprises any fraction of the effective proportions of vitamin E and selenium not included in the first oral solid dosage form.

8. The composition of claim 6 wherein the effective proportions of all constituents of the nutraceutical composition are distributed essentially equally between the first and second oral solid dosage forms.

9. The composition of claim 6 wherein the tripeptide component consists essentially of glutathione.

10. The composition of claim 6 wherein the amino acid component consists essentially of lysine.

11. The composition of claim 6 wherein the brazilin component consists essentially of brazilin.

12. The composition of claim 6 wherein the flavonoid component consists essentially of quercetin, silymarin, and rutin.

13. The composition of claim 12 wherein the ratio-by-weight of quercetin:silymarin component:rutin in the flavonoid component is about 1:1.25:0.3.

14. The composition of claim 6 further comprising, in each of the first and second solid oral dosage forms, at least one pharmaceutically acceptable excipient.

15. The composition of claim 1 wherein the constituents of the nutraceutical composition are present in the following approximate effective proportions:
   1) between about 190 and about 210 pbw tripeptide component,
   2) between about 5 and about 15 pbw guanidine hydrochloride,
   3) between about 10 and about 20 pbw α-lipoic acid,
   4) between about 45 and about 55 pbw brazilin component,
   5) between about 20 and about 30 pbw amino acid component,
   6) between about 120 and about 130 pbw flavonoid component, and
   7) between about 10 and about 20 pbw catalase.

16. The composition of claim 15 further comprising between 10 to about 35 pbw vitamin E and up to 0.025 pbw selenium.

17. A nutraceutical composition in the form of first and second oral solid dosage forms wherein the first solid oral dosage form comprises:
   1) from about 95 to about 110 pbw tripeptide component that consists essentially of glutathione,
   2) from about 5 to about 15 pbw guanidine hydrochloride,
   3) from about 100 to about 115 pbw of flavonoid component that consists essentially of quercetin and silymarin, and
   wherein the second solid oral dosage form comprises:
   1) from about 95 to about 110 pbw tripeptide component that consists essentially of glutathione,
   2) from about 10 to about 20 pbw α-lipoic acid,
   3) from about 20 to about 30 pbw lysine, 4) from about 45 to about 55 pbw of a brazilin component, 5) from about 10 to about 20 pbw of flavonoid component that consists essentially of rutin, and 6) from about 10 to about 20 pbw of catalase.

18. The composition of claim 17 further comprising from about 5 pbw to about 30 pbw of vitamin E and from about 0.01 pbw to about 0.025 pbw selenium; wherein the amounts of vitamin E and selenium are, independently, distributed equally or unequally between the first and second oral solid dosage forms.

19. The composition of claim 17 further comprising, in each of the first and second solid oral dosage forms, at least one pharmaceutically acceptable excipient.

20. A method for maintaining normal blood sugar levels and normal levels of non-enzymatic protein glycosylation in a human comprising the step of administering to the human a blood sugar and glycosylation maintaining effective amount of a nutraceutical composition comprising the following constituents:

1) a tripeptide component 2) guanidine hydrochloride,

3) α-lipoic acid, 4) a brazilin component, 5) an amino acid component, 6) a flavonoid component, and 7) catalase, wherein each of the constituents is present in the composition in an effective proportion.

21. The method of claim 20 wherein the nutraceutical composition further comprises an effective proportion of vitamin E and an effective proportion of selenium.

22. The method of claim 20 wherein the nutraceutical composition is in an oral liquid dosage form.

23. The method of claim 20 wherein the nutraceutical composition is in an oral solid dosage form.

24. The method of claim 20 wherein the nutraceutical composition is in an oral solid dosage form.

25. The method of claim 24 wherein the nutraceutical composition is in the form of first and second oral solid dosage forms wherein the first oral dosage form comprises:

1) from none to all of the effective proportion of the tripeptide component, 2) from none to all of the effective proportion of guanidine hydrochloride, 3) from none to all of the effective proportion of α-lipoic acid, 4) from none to all of the effective proportion of brazilin component, 5) from none to all of the effective proportion of amino acid component, 6) from none to all of the effective proportion of flavonoid component, and 7) from none to all of the effective proportion of catalase, with the proviso that the first solid oral dosage form includes at least a fraction of the effective proportion of at least one constituent but, less than all of the effective proportion of at least one constituent and wherein the second solid oral dosage form comprises any fraction of the effective proportions of tripeptide component, guanidine hydrochloride, □α-lipoic acid, amino acid component, brazilin component, flavonoid component, and catalase not included in the first solid oral dosage form.

26. The method of claim 25 wherein the first oral solid dosage form further comprises from none to all of an effective proportion of vitamin E and from none to all of an effective proportion of selenium and wherein the at least second oral solid dosage form comprises any fraction of the effective proportions of vitamin E and selenium not included in the first oral solid dosage form.

27. The method of claim 25 wherein the effective proportions of all constituents of the nutraceutical composition are distributed essentially equally between the first and second oral solid dosage forms.

28. A method for maintaining normal blood sugar levels and normal levels of non-enzymatic protein glycosylation in a human comprising the step of administering a blood sugar and glycosylation maintaining effective amount of a nutraceutical composition comprising the following constituents in their approximate effective proportions:

1) from about 190 to about 210 pbw of a tripeptide component, 2) from about 120 to about 130 pbw of a flavonoid component, 3) from about 5 to about 15 pbw guanidine hydrochloride, 4) from about 10 to about 20 pbw α-lipoic acid, 5) from about 20 to about 30 pbw lysine, 6) from about 45 to about 55 pbw brazilin component, and 7) from about 10 to about 20 pbw catalase.

29. The method of claim 28 further comprising from about 10 to about 35 pbw vitamin E and from about 0.01 to about 0.025 pbw selenium.

30. The method of claim 28 wherein the nutraceutical composition is in the form of first and second oral solid dosage form wherein the first solid oral dosage form comprises:

1) from none to all of the tripeptide component, 2) from none to all of the of guanidine hydrochloride, 3) from none to all of the α-lipoic acid, 4) from none to all of the brazilin component, 5) from none to all of the amino acid component, 6) from none to all of the flavonoid component, and 7) from none to all of the catalase, with the proviso that the first solid oral dosage form includes at least a fraction of the effective proportion of at least one constituent, but less than all of at least one constituent and wherein the second solid oral dosage form comprises any fraction of the tripeptide component, guanidine hydrochloride, α-lipoic acid, amino acid component, brazilin component, flavonoid component, and catalase not included in the first solid oral dosage form.

31. The method of claim 22 wherein both the first solid oral dosage form and the second solid oral dosage form each further comprise at least one pharmaceutically acceptable excipient.

32. The method of claim 22 wherein the blood sugar and glycosylation maintaining effective amount is between about 6.0 mg and about 8.0 mg per kilogram of body weight of the human to whom the nutraceutical composition is administered.

* * * * *

UNITED STATES PATENT AND TRADEMARK OFFICE
CERTIFICATE OF CORRECTION

PATENT NO. : 6,585,998 B2
DATED : July 1, 2003
INVENTOR(S) : Cartwright et al.

It is certified that error appears in the above-identified patent and that said Letters Patent is hereby corrected as shown below:

<u>Title page,</u>
Item [57], ABSTRACT,
Line 1, change "tripeptoid" to -- tripeptide --;
Line 4, change "ans" to -- and --;

<u>Column 4,</u>
Line 39, change "Eegland" to -- England --;
Line 55, change "InteralL" to -- Internal --;

<u>Column 8,</u>
Line 27, change "disintergrants" to -- disintegrants --;

<u>Column 9,</u>
Line 7, change "halve" to -- half --;
Line 23, change "Sciemce and Practict" to -- Science and Practice --;

<u>Column 13,</u>
Line 63, change "□α-lipoic acid" to -- α-lipoic --;

Signed and Sealed this

Twenty-second Day of June, 2004

JON W. DUDAS
*Acting Director of the United States Patent and Trademark Office*